(12) United States Patent
Liu (10) Patent No.: US 12,367,593 B2
(45) Date of Patent: Jul. 22, 2025

(54) METHODS AND APPARATUSES FOR DETERMINING STATUSES OF POSITIONS ON SHELVES, SHELVES AND NON-TRANSITORY COMPUTER-READABLE STORAGE MEDIA

(71) Applicant: BOE Technology Group Co., Ltd., Beijing (CN)

(72) Inventor: Tong Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 114 days.

(21) Appl. No.: 17/792,482

(22) PCT Filed: Jun. 21, 2021

(86) PCT No.: PCT/CN2021/101296
§ 371 (c)(1),
(2) Date: Jul. 13, 2022

(87) PCT Pub. No.: WO2021/259209
PCT Pub. Date: Dec. 30, 2021

(65) Prior Publication Data
US 2023/0104061 A1    Apr. 6, 2023

(30) Foreign Application Priority Data

Jun. 24, 2020  (CN) .......................... 202010589051.8

(51) Int. Cl.
*G06Q 10/087*     (2023.01)
*G06T 7/20*       (2017.01)
(Continued)

(52) U.S. Cl.
CPC ............. *G06T 7/20* (2013.01); *G06Q 10/087* (2013.01); *G06T 7/254* (2017.01); *G06T 7/70* (2017.01); *G06V 20/50* (2022.01)

(58) Field of Classification Search
CPC .. G06T 7/20; G06T 7/254; G06T 7/70; G06T 2207/20084; G06T 7/73; G06Q 10/087;
(Continued)

(56) References Cited

U.S. PATENT DOCUMENTS 10,140,820 B1 * 11/2018 Zalewski ........... G06Q 30/0633
11,475,404 B2 * 10/2022 Adato ................ G06Q 10/0875
(Continued)

FOREIGN PATENT DOCUMENTS

CN          105531715 A       4/2016
CN          108320379 A       7/2018
(Continued)

OTHER PUBLICATIONS

"Superimposed Inventory and Supply Management for Physical Retail Interactions" Apr. 27, 2021. IP.com No. IPCOM000265589D (Year: 2021).*
(Continued)

*Primary Examiner* — Fahd A Obeid
*Assistant Examiner* — Jessica E Sullivan
(74) *Attorney, Agent, or Firm* — IPro, PLLC (57) ABSTRACT

The present disclosure relates to a method and apparatus for determining a status of a position on a shelf, a shelf and a non-transitory computer-readable storage medium. The method includes: acquiring current detection data of the shelf in a current detection period; determining first status information of respective positions from the current detection data, in response to determining that the current detection data satisfies a preset condition; in response to the current detection data indicating that a target position whose first status information indicates the first status exists, acquiring first status information of the target position from previous detection data in a previous detection period; and determining second status information of the target position (Continued)

based on the first status information of the target position in the current detection data and the previous detection data respectively, the second status information indicating a third status that an object is put back.

5 Claims, 6 Drawing Sheets

(51) Int. Cl.
*G06T 7/254* (2017.01)
*G06T 7/70* (2017.01)
*G06V 20/50* (2022.01)

(58) Field of Classification Search
CPC ........ G06V 20/50; G06V 10/50; G06V 10/54; G06V 10/803; G06V 20/00; H04N 7/183; A47F 5/00; A47F 11/00
See application file for complete search history.

(56) References Cited

U.S. PATENT DOCUMENTS

| | | | | |
|---|---|---|---|---|
| 2008/0270270 | A1* | 10/2008 | Ramachandra | G06Q 10/087 705/28 |
| 2014/0006229 | A1* | 1/2014 | Birch | G06Q 10/087 705/28 |
| 2015/0019391 | A1* | 1/2015 | Kumar | G06Q 10/087 705/28 |
| 2022/0114647 | A1* | 4/2022 | Bronicki | G07G 1/0072 |

FOREIGN PATENT DOCUMENTS

| | | |
|---|---|---|
| CN | 108460933 A | 8/2018 |
| CN | 108831019 A | 11/2018 |
| CN | 111753728 A | 10/2020 |

OTHER PUBLICATIONS

PCT/CN2021/101296 international search report.
PCT/CN2021/101296 Written Opinion.

* cited by examiner

METHODS AND APPARATUSES FOR DETERMINING STATUSES OF POSITIONS ON SHELVES, SHELVES AND NON-TRANSITORY COMPUTER-READABLE STORAGE MEDIA

CROSS-REFERENCE TO RELATED APPLICATIONS

The present disclosure is the U.S. national phase of PCT Application No. PCT/CN2021/101296 filed on Jun. 21, 2021, which claims priority to Chinese Patent Application No. 202010589051.8 filed on Jun. 24, 2020 and entitled "METHODS AND APPARATUSES FOR DETERMINING STATUSES OF POSITIONS ON SHELVES, AND SHELVES", both of which are incorporated herein by reference in their entireties.

TECHNICAL FIELD

The present disclosure relates to the field of data processing technology, and in particular to a method and apparatus for determining a status of a position on a shelf, a shelf and a non-transitory computer-readable storage medium.

BACKGROUND

At present, new types of shelves have been increasingly used in scenarios such as new retail, exhibitions, and precious metal displays in banks. By placing objects in a plurality of positions on the shelf, it may be convenient for users to pick and place the objects on their own. In order to facilitate users to learn about an inventory of objects on a shelf, the shelf may show a position on the shelf as vacant when an object leaves the position, and the shelf may show the position on the shelf as occupied when the user puts the object back in the position, thereby ensuring an interaction effect.

SUMMARY

The present disclosure provides a method and apparatus for determining a status of a position on a shelf, a shelf and a non-transitory computer-readable storage medium.

In a first aspect, embodiments of the present disclosure provide a method of determining a status of a position on a shelf, the position being operatively configured to accommodate an object, the method including:

acquiring current detection data of the shelf in a current detection period, where the current detection data includes data of one or more positions on the shelf;

determining first status information of respective positions from the current detection data, in response to determining that the current detection data satisfies a preset condition, where the first status information indicates a first status that there is an object in a position or a second status that there is no object in a position;

in response to the current detection data indicating that a target position whose first status information indicates the first status exists, acquiring first status information of the target position from previous detection data in a previous detection period; and determining second status information of the target position based on the first status information of the target position in the current detection data and the previous detection data respectively, where the second status information indicates a third status that an object is put back.

Optionally, determining that the current detection data satisfies the preset condition, includes:

determining whether the current detection data includes motion data;

acquiring a first time interval between time of the current detection period and time of a last detection period containing the motion data, in response to determining that the current detection data does not include the motion data; and determining that the current detection data satisfies the preset condition when the first time interval exceeds a first preset time interval.

Optionally, the current detection data includes a current frame image collected by a camera; and determining whether the current detection data includes the motion data, includes:

acquiring a difference in grayscale values between the current frame image and a previous frame image at a same pixel;

determining a number of pixels with the difference in grayscale values exceeding a preset grayscale threshold; and determining that the current frame image includes the motion data representing a motion relative to the previous frame image, in response to a ratio of the number to a total number of pixels in the current frame image exceeding a preset ratio threshold, otherwise determining that the current frame image does not include the motion data.

Optionally, determining the second status information of the target position based on the first status information of the target position in the current detection data and the previous detection data respectively, includes:

determining that the second status information of the target position indicates the third status, in response to the first status information of the target position in the previous detection data indicating the second status.

In a second aspect, embodiments of the present disclosure provide an apparatus for determining a status of a position on a shelf, the position being operatively configured to accommodate an object, the apparatus including:

a current data acquiring module, configured to acquire current detection data of the shelf in a current detection period, where the current detection data includes data of one or more positions on the shelf;

a first status determining module, configured to determine first status information of respective positions from the current detection data, in response to determining that the current detection data satisfies a preset condition, where the first status information indicates a first status that there is an object in a position or a second status that there is no object in a position;

a first status acquiring module, configured to: in response to the current detection data indicating that a target position whose first status information indicates the first status exists, acquire first status information of the target position from previous detection data in a previous detection period; and a second status determining module, configured to determine second status information of the target position based on the first status information of the target position in the current detection data and the previous detection data respectively, where the second status information indicates a third status that an object is put back.

Optionally, the first status determining module includes:

a motion data determining unit, configured to determine whether the current detection data includes motion data;

a first interval acquiring unit, configured to acquire a first time interval between time of the current detection period and time of a last detection period containing the motion data, in response to determining that the current detection data does not include the motion data; and a condition satisfaction determining unit, configured to determine that the current detection data satisfies the preset condition when the first time interval exceeds a first preset time interval.

Optionally, the current detection data includes a current frame image collected by a camera; and the motion data determining unit includes:

a grayscale difference acquiring subunit, configured to acquire a difference in grayscale values between the current frame image and a previous frame image at a same pixel;

a pixel number determining subunit, configured to determine a number of pixels with the difference in grayscale values exceeding a preset grayscale threshold; and a motion data determining subunit, configured to determine that the current frame image includes the motion data representing a motion relative to the previous frame image, in response to a ratio of the number to a total number of pixels in the current frame image exceeding a preset ratio threshold, otherwise determine that the current frame image does not include the motion data.

Optionally, the second status determining module includes:

a third status determining unit, configured to determine that the second status information of the target position indicates the third status, in response to the first status information of the target position in the previous detection data indicating the second status.

In a third aspect, embodiments of the present disclosure provide a shelf including:

a main body provided with a plurality of layers, each of which is provided with a plurality of positions that are operatively configured to accommodate objects;

a data collector configured to collect current detection data of the shelf in a current detection period, where the current detection data includes data of one or more positions on the shelf; and a processor coupled with the data collector and configured to:

acquire the current detection data;

determine first status information of respective positions from the current detection data, in response to determining that the current detection data satisfies a preset condition, where the first status information indicates a first status that there is an object in a position or a second status that there is no object in a position;

in response to the current detection data indicating that a target position whose first status information indicates the first status exists, acquire first status information of the target position from previous detection data in a previous detection period; and determine second status information of the target position based on the first status information of the target position in the current detection data and the previous detection data respectively, where the second status information indicates a third status that an object is put back.

Optionally, determining that the current detection data satisfies the preset condition, includes:

determining whether the current detection data includes motion data;

acquiring a first time interval between time of the current detection period and time of a last detection period containing the motion data, in response to determining that the current detection data does not include the motion data; and determining that the current detection data satisfies the preset condition when the first time interval exceeds a first preset time interval.

Optionally, the data collector includes a camera, and the current detection data includes a current frame image collected by the camera; and determining whether the current detection data includes the motion data, includes:

acquiring a difference in grayscale values between the current frame image and a previous frame image at a same pixel;

determining a number of pixels with the difference in grayscale values exceeding a preset grayscale threshold; and determining that the current frame image includes the motion data representing a motion relative to the previous frame image, in response to a ratio of the number to a total number of pixels in the current frame image exceeding a preset ratio threshold, otherwise determining that the current frame image does not include the motion data.

Optionally, determining the second status information of the target position based on the first status information of the target position in the current detection data and the previous detection data respectively, includes:

determining that the second status information of the target position indicates the third status, in response to the first status information of the target position in the previous detection data indicating the second status.

Optionally, the data collector includes a plurality of pressure sensors provided at the bottom of the respective positions, and the current detection data includes current pressure data collected by the plurality of pressure sensors.

Optionally, the shelf further includes a display provided at a preset location of the main body and configured to display the first status information or the second status information of the respective positions.

In a fourth aspect, embodiments of the present disclosure provide a shelf including:

a main body provided with a plurality of layers, each of which is provided with a plurality of positions that are operatively configured to accommodate objects;

a camera provided on the top of the main body, having a field of view covering all of the positions on the main body, and configured to capture current frame images of one or more positions; and a processor coupled with the camera and configured to acquire first status information or second status information of respective positions based on the current frame images.

In a fifth aspect, embodiments of the present disclosure provide a shelf including:

a main body provided with a plurality of layers, each of which is provided with a plurality of positions that are operatively configured to accommodate objects;

a plurality of pressure sensors provided at the bottom of the respective positions, and configured to acquire current pressure data of the respective positions; and a processor coupled with the plurality of pressure sensors and configured to acquire first status information or second status information of the respective positions based on the current pressure data.

Optionally, the shelf further includes a display provided at a preset location of the main body and configured to display the first status information or the second status information of the respective positions.

In a sixth aspect, embodiments of the present disclosure provide a non-transitory computer-readable storage medium having a computer executable program stored therein, where the computer executable program, when executed by a processor, causes the processor to perform the above method.

It should be understood that the above general description and the following detailed description are merely exemplary and explanatory, and are not intended to limit the present disclosure.

BRIEF DESCRIPTION OF DRAWINGS

The drawings herein, which are incorporated into the specification and constitute a part of the specification, illustrate embodiments in accordance with the present disclosure, and are used together with the specification to explain the principle of the present disclosure.

DETAILED DESCRIPTION

Exemplary embodiments will be described in detail herein, and examples thereof are illustrated in the drawings. When the following description refers to the drawings, the same numbers in different drawings indicate the same or similar elements, unless otherwise indicated. The implementations described in the following exemplary embodiments do not represent all implementations in accordance with the present disclosure. Rather, they are merely examples of apparatuses and methods in accordance with some aspects of the present disclosure as detailed in the appended claims.

In the related art, the presence of an object in a position on a shelf may indicate that the object is always there or that the object has just been put back by a user. Considering that the user may go back to re-observe the object he/she just put back, showing only that the object is available in the position on the shelf would not provide the user with an accurate indication, resulting in the user not being able to find the object he/she just put back, especially in scenarios where objects in the positions on the shelf are slightly different from each other.

Figure 1:
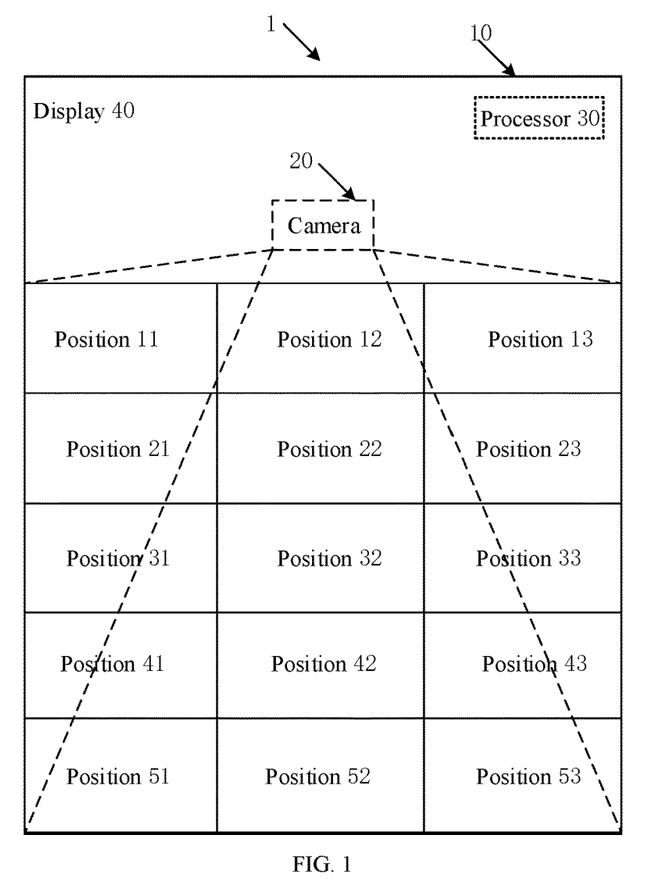
FIG. 1 is a schematic diagram illustrating a shelf according to an embodiment of the present disclosure.

In view of this, an embodiment of the present disclosure provides a shelf. Referring to FIG. 1, the shelf 1 includes a main body 10, a camera 20 and a processor 30.

The main body 10 is provided with a plurality of layers, each of which is provided with a plurality of positions that are operatively configured to accommodate objects, such as positions 11, 12, and 13, positions 21, 22, and 23, . . . , positions 51, 52, and 53 in FIG. 1. The first number of a reference numeral indicating a position represents which layer the position is located on, and the second number represents an ordinal number of the position on this layer. For example, the position 11 indicates the first position on the first layer.

The camera 20 is provided on the top of the main body 10, has a field of view (space enclosed by four dashed lines in FIG. 1) covering all of the positions on the main body 10, and is configured to capture current frame images of one or more positions.

The processor 30 is coupled with the camera 20, and configured to acquire first status information or second status information of respective positions based on the current frame images. The first status information indicates a first status that there is an object in a position or a second status that there is no object in a position. The second status information indicates a third status that an object is put back.

In an embodiment, the shelf 1 may further include a display 40 with an LCD display screen, an LED display screen, or an OLED display screen. The display 40 may be provided at a preset location of the main body 10 such that a user in front of the shelf 1 can view contents displayed thereon, and the display 40 may be configured to display the first status information or the second status information of the respective positions. For example, a center point of the preset location may be level with the user's line of sight when the user is standing. Considering that a height of the user is approximately between 120 cm and 200 cm, a height of the preset location may be set between 130 cm and 170 cm.

It should be noted that the camera 20 and the processor 30 are denoted with dashed boxes, indicating that they are provided behind the display 40, and the user cannot directly see the camera 20 and the processor 30 when viewing the contents displayed on the display 40. In an implementation, the camera 20 may also be provided on a bottom layer of the shelf 1 with its field of view covering the respective positions.

Figure 2:
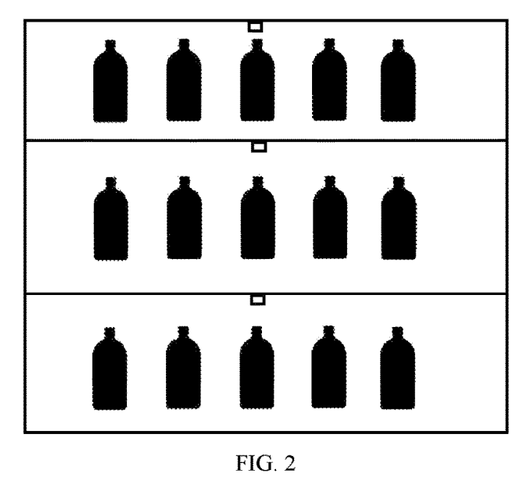
FIG. 2 is a schematic diagram illustrating a mounting position of a camera according to an embodiment of the present disclosure.
Figure 3:
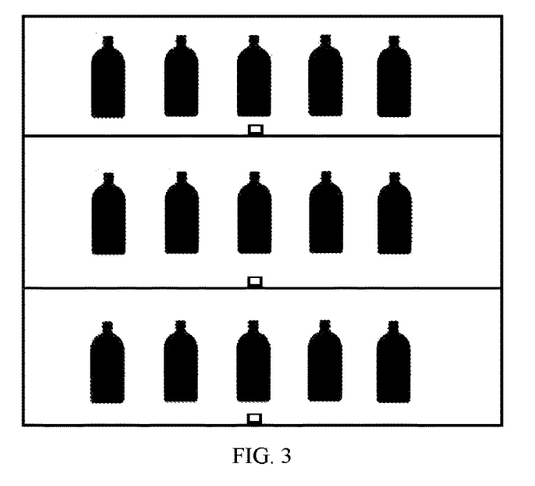
FIG. 3 is a schematic diagram illustrating a mounting position of a camera according to another embodiment of the present disclosure.

It should be noted that, in an implementation, the camera 20 may automatically adjust a focal length thereof such that the field of view may cover one or more positions to be captured. In this way, the current detection data may include data of the one or more positions. Alternatively, the camera 20 may capture an image involving all of the positions on the shelf 1, and the processor 30 may segment the image to obtain an image involving the one or more positions. Those skilled in the art may select an appropriate manner according to a specific scenario, and any scheme, in which the current detection data of the one or more positions may be obtained, falls within the protection scope of the present disclosure. Alternatively, one camera 20 may be provided on each layer of the main body 10, as shown in FIGS. 2 and 3. The cameras 20 in FIG. 2 are each provided on the top of a respective layer, and the cameras 20 in FIG. 3 are each provided on the bottom of a respective layer.

Figure 4:
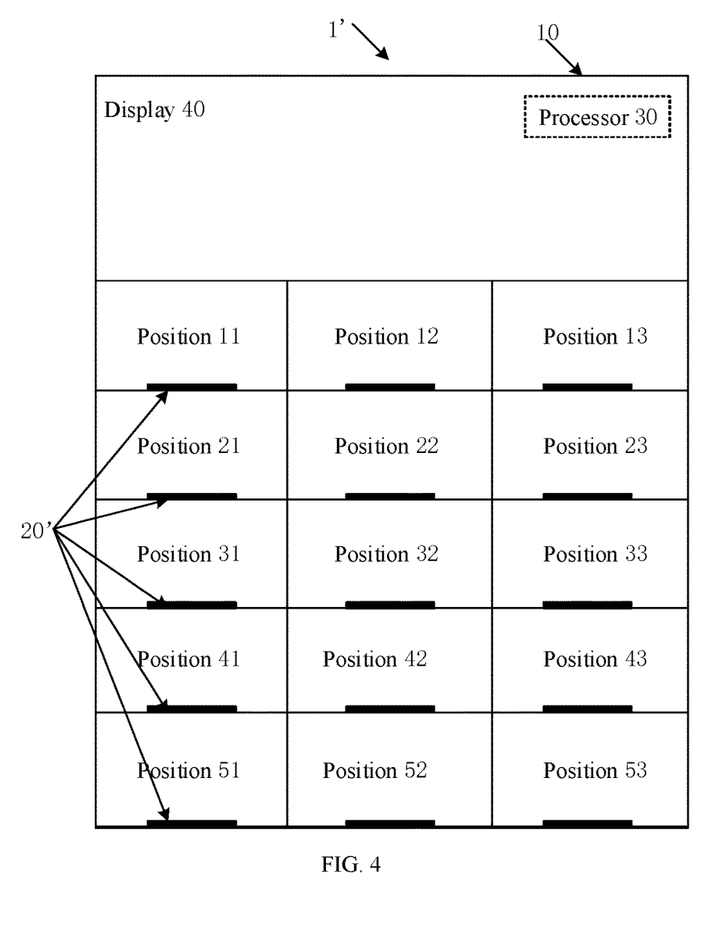
FIG. 4 is a schematic diagram illustrating a shelf according to another embodiment of the present disclosure.

Another embodiment of the present disclosure further provides a shelf. Referring to FIG. 4, the shelf 1' includes a main body 10, a plurality of pressure sensors 20', and a processor 30. The shelf 1' differs from the shelf 1 shown in FIG. 1 in that: the pressure sensors 20' are provided in respective positions and configured to acquire current pressure data of the respective positions, and the processor 30 is coupled with the pressure sensors 20' and configured to acquire the first status information or the second status information of the respective positions based on the current pressure data. When there is an object placed in a position, the pressure sensor 20' may detect pressure data exceeding a pressure threshold; and when there is no object placed in a position, the pressure sensor 20' may detect pressure data less than the pressure threshold. For other identical components, reference may be made to the embodiment shown in FIG. 1, which will not be repeated herein.

Figure 5:
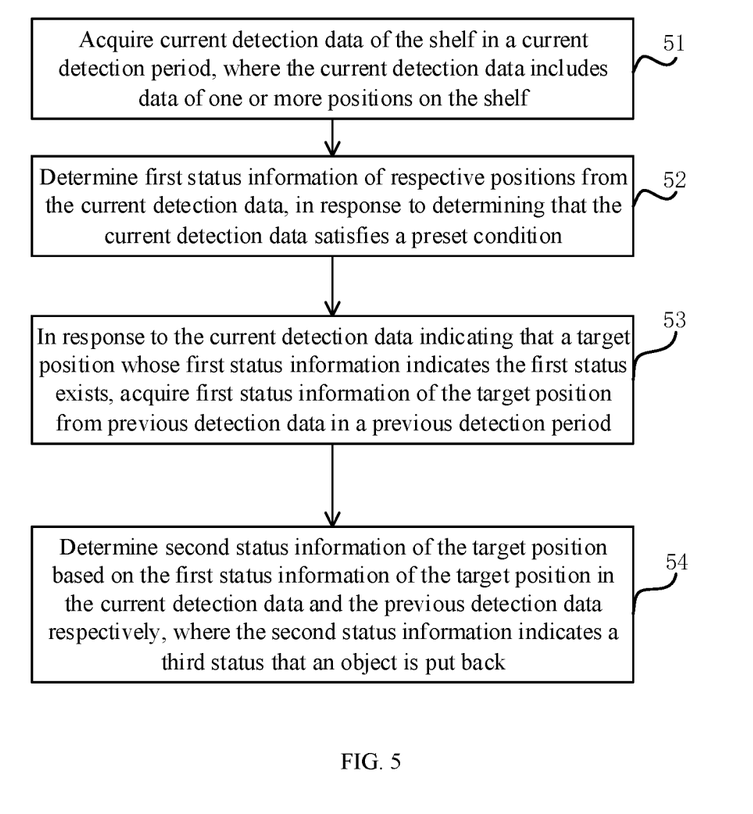
FIG. 5 is a flowchart illustrating a method of determining a status of a position on a shelf according to an embodiment of the present disclosure.

Based on the shelves shown in FIGS. 1 and 4, an embodiment of the present disclosure further provides a method of determining a status of a position on a shelf. FIG. 5 is a flowchart illustrating a method of determining a status of a position on a shelf according to an embodiment of the present disclosure. Referring to FIG. 5, a method of determining a status of a position on a shelf includes step 51 to step 54.

At step 51, current detection data of the shelf in a current detection period is acquired, where the current detection data includes data of one or more positions on the shelf.

In this example, the processor 30 may acquire the current detection data of the shelf in the current detection period in real time or periodically. The processor 30 may be implemented by a server or an embedded system, which is not limited herein.

In an implementation, a device configured to collect the current detection data may be a data collector such as a camera or a pressure sensor. For example, in the shelf shown in FIG. 1, the camera 20 may capture current frame images of one or more positions in real time or periodically, and in this case, the current detection data may include the current frame images. For another example, in the shelf shown in FIG. 2, the pressure sensors 20' may acquire pressure data of one or more positions in real time or periodically to obtain current pressure data in the current detection period, and in this case, the current detection data may include the current pressure data.

At step 52, first status information of respective positions is determined from the current detection data, in response to determining that the current detection data satisfies a preset condition, where the first status information indicates a first status that there is an object in a position or a second status that there is no object in a position.

Figure 6:
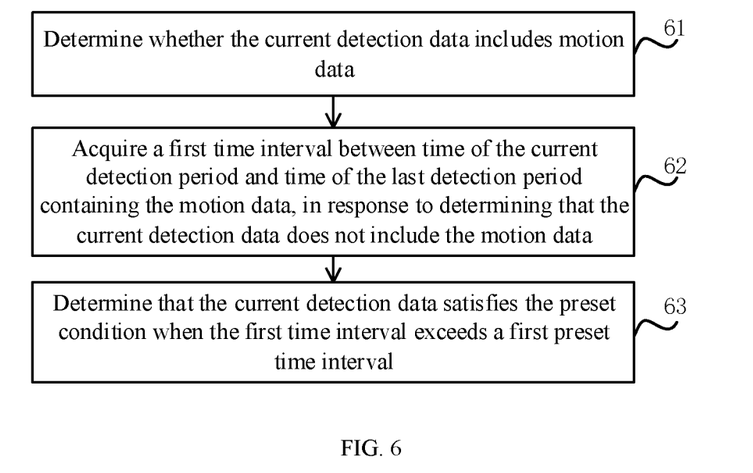
FIG. 6 is a flowchart of determining whether current detection data satisfies a preset condition according to an embodiment of the present disclosure.

In this example, the processor 30 may determine whether the current detection data acquired at step 51 satisfies the preset condition, which may include step 61 to step 63 as shown in FIG. 6.

At step 61, the processor 30 may determine whether the current detection data includes motion data. When a change in data of the same position in the current detection data and previous detection data in a previous detection period exceeds a threshold, it may be determined that the data of the position in the current detection data is the motion data.

Figure 7:
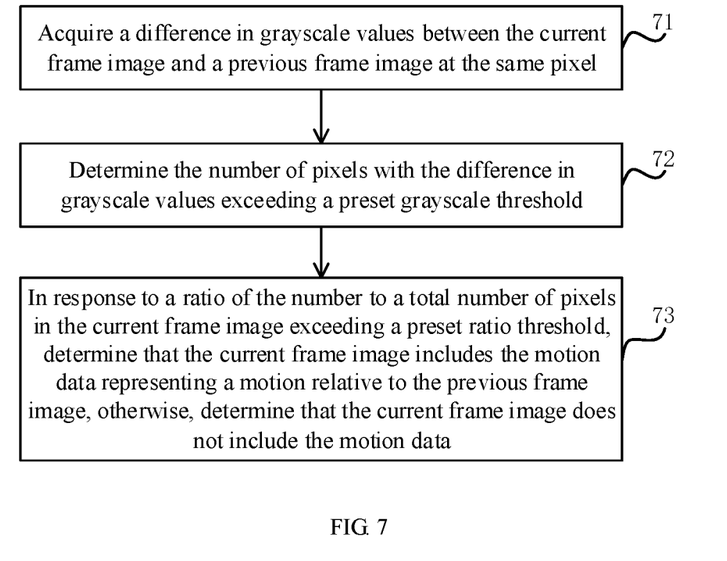
FIG. 7 is a flowchart of determining whether current detection data includes motion data according to an embodiment of the present disclosure.

In this example, the current detection data including the current frame images is taken as an example to determine whether the current detection data includes the motion data, which may include step 71 to step 73 as shown in FIG. 7.

At step 71, the processor 30 may acquire a difference in grayscale values between the current frame image and a previous frame image at the same pixel. At step 72, the processor 30 may determine the number of pixels with the difference in grayscale values exceeding a preset grayscale threshold. In an implementation, the preset grayscale threshold may be set to 50. At step 73, in response to a ratio of the number to a total number of pixels in the current frame image exceeding a preset ratio threshold, the processor 30 may determine that the current frame image includes the motion data representing a motion relative to the previous frame image, otherwise, the processor 30 may determine that the current frame image does not include the motion data. In an implementation, the preset ratio threshold may be set to 30%.

It should be noted that, the processor 30 may perform motion detection on the entire frame image at step 71 to step 73. However, the processor 30 may acquire sub-images of the 111 respective positions from the current frame image, and then perform step 71 to step 73 on each sub-image. Since the sub-image from which a background area has been removed has a relatively small area, it may be processed at a relatively high speed. Those skilled in the art may select appropriate schemes according to specific scenarios, which are not limited herein.

At step 62, the processor 30 may acquire a first time interval between time of the current detection period and time of the last detection period containing the motion data, in response to determining that the current detection data does not include the motion data. The last detection period refers to a detection period before the current detection period. Since detection data acquired in each detection period may include motion data or may not include motion data, the last detection period containing the motion data refers to a detection period that detection data contains the motion data and having the shortest time interval from detection time of the current detection period. That is, none of detection data acquired between the current detection period and the last detection period containing the motion data contains the motion data.

At step 63, the processor 30 may determine that the current detection data satisfies the preset condition when the first time interval exceeds a first preset time interval.

The embodiment shown in FIG. 6 indicates that, the preset condition means that neither the current detection data nor detection data within the first preset time interval before the current detection period contains the motion data, in the case that the current detection data includes the current frame image.

It may be understood that when the current detection data includes pressure data collected by the pressure sensors in the shelf, motion detection may not be performed on the current detection data, considering that putting back an object is an instantaneous action. In other words, the preset condition means that no motion detection is performed in the case that the current detection data includes the current pressure data.

In this example, a status discriminator may be pre-stored in the shelf 1. The status discriminator may be implemented by a neural network model, a template difference model or a template matching model, which may be set according to specific scenarios. The processor 30 may input the current detection data to the status discriminator, and acquire first status information of respective positions output from the status discriminator. For example, the first status information may indicate a first status that there is an object in a position. For another example, the first status information may indicate a second status that there is no object in a position.

Taking the status discriminator implemented by the template difference model as an example, the status discriminator may include a standard template that contains detection data collected when no object is placed in any position. Taking the detection data including an image as an example, the respective positions are vacant in the standard template, and the status discriminator may obtain a difference image by subtracting the standard template from the current frame image. If a grayscale difference of each pixel for a position in the difference image is relatively large (for example, more than a preset threshold such as 10), it means that there is an object placed in this position. If a grayscale difference of each pixel for a position in the difference image is relatively small (for example, less than the preset threshold such as 10), it means that there is no object placed in this position, and this position is vacant. Setting the preset threshold as 10 is to match a deviation between various images captured under different light. Taking the detection data including pressure data as an example, the respective positions are vacant in the standard template, and the status discriminator may obtain a difference pressure by subtracting the standard template from the current pressure data. If the difference pressure in a position is relatively large (for example, more than a preset threshold such as 10 gram), it means that there is an object placed in this position. If the difference pressure in a position is relatively small (for example, less than the preset threshold such as 10 gram), it means that there is no object placed in this position, and this position is vacant.

Taking the status discriminator implemented by the neural network model as an example, a certain number of training samples may be acquired, and each position in each of the training samples may be labelled with first status information (which indicates that there is an object in a position or there is no object in a position, for example). Then, the neural network model may be trained using the above training samples until a loss value determined from a loss function is less than or equal to a loss threshold. In this way, the current detection data may be input to the neural network model, and the first status information of each position may be determined by the neural network model.

Taking the status discriminator implemented by the template matching model as an example, the status discriminator may include a standard template that contains detection data collected when no object is placed in any position. Taking the detection data including an image as an example, the status discriminator may acquire a similarity between each position in the current frame image and a corresponding position in the standard template, which may be determined by using a cosine formula in the related art. Then, the status discriminator may compare the determined similarity with a preset similarity threshold (for example, 0.9). When the similarity is greater than or equal to the similarity threshold, it may be determined that the position in the current frame image is similar to the corresponding position in the standard template, otherwise it may be determined that the position in the current frame image is not similar to the corresponding position in the standard template. That is, when the position in the current frame image is similar to the corresponding position in the standard template, the processor 30 may determine that there is no object in the position; and when the position in the current frame image is not similar to the corresponding position in the standard template, the processor 30 may determine that there is an object in the position, thereby obtaining the first status information.

It should be noted that when a camera or a pressure sensor is provided on the shelf, that is, when the current detection data includes image data or pressure data, the above-mentioned status discriminator may be configured to obtain the first status information. When a camera and a pressure sensor are provided on the shelf at the same time, the pressure sensor may be configured for auxiliary detection. For example, it is determined that the first status information indicates the second status that there is no object in a position, which may include a situation that a color of the object in the position is very similar to a background color (for example, both are white), and the first status information obtained in this situation may be inaccurate. For this reason, the processor 30 may acquire pressure data of each position in the second status. If the pressure data is less than or equal to a preset pressure threshold, it means that there is no object in the position, and it may be determined that the second status is accurate and reliable. If the pressure data is greater than the preset pressure threshold, it means that there is an object in the position, and it may be determined that the second status is inaccurate. At this time, the processor 30 may adjust the first status information of the position to the first status. In other words, the processor 30 may use the pressure data to perform auxiliary verification on each position in the second status, so as to solve the problem that the obtained first status information is inaccurate when a color of an object in a position is the same as or similar to a background color, which is beneficial to improve the detection accuracy.

In practical applications, the processor 30 may perform the auxiliary verification on a part of the positions that meet the requirements with the pressure data. Taking the status discriminator implemented by the template matching model as an example, the status discriminator may provide the similarity calculated when determining the first status information. At this time, only when the similarity is less than the similarity threshold, and a difference between the similarity threshold and the similarity is less than a difference threshold, the auxiliary verification is performed with the pressure data, thereby reducing the calculation. For example, if the similarity threshold is 0.9 and the difference threshold is 0.05, then only when the similarity is between 0.9 and 0.85, the auxiliary verification is performed with the pressure data.

At step 53, in response to the current detection data indicating that a target position whose first status information indicates the first status exists, first status information of the target position is acquired from previous detection data in a previous detection period.

In this example, the processor 30 may acquire a position whose first status information indicates the first status from the current detection data, which is hereinafter referred to as a target position. Then, the processor 30 may acquire the previous detection data, i.e., detection data in the previous detection period of the current detection period, and acquire the first status information of each target position from the previous detection data.

At step 54, second status information of the target position is determined based on the first status information of the target position in the current detection data and the previous detection data respectively, where the second status information indicates a third status that an object is put back.

In this example, the processor 30 may determine the second status information of the target position based on the first status information of the target position in the current detection data and the previous detection data. The processor 30 may determine that the second status information of the target position indicates the third status, which indicates that the object in the position on the shelf has just been put back, in response to the first status information of the target position in the previous detection data indicating the second status. If the first status information of the target position in the previous detection data indicates the first status, it means that the object is always present in the position on the shelf.

Figure 8:
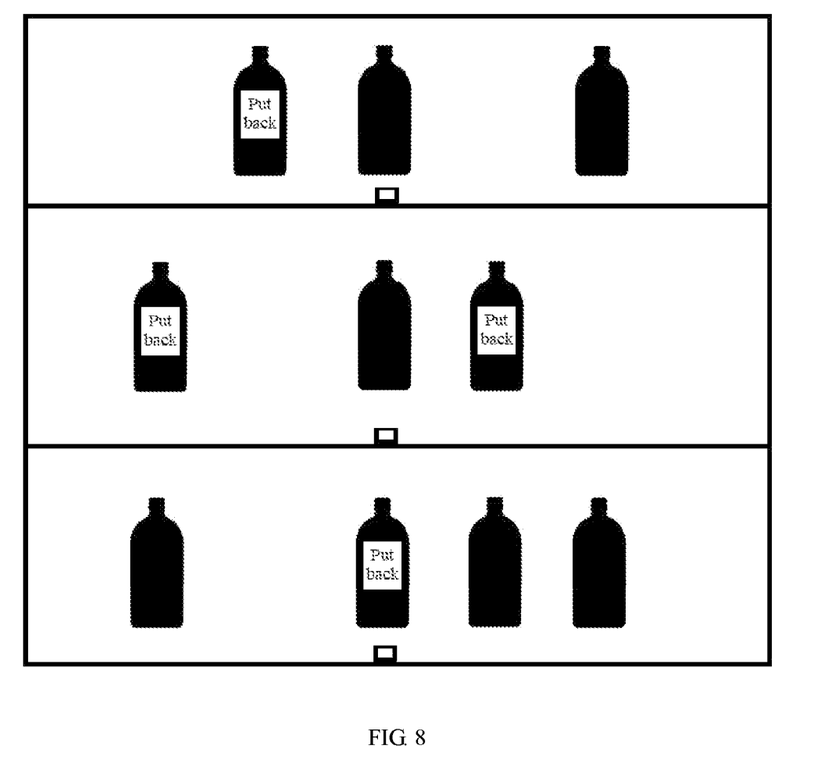
FIG. 8 is a schematic diagram illustrating an effect of displaying status information of a position according to an embodiment of the present disclosure.

In this example, the processor 30 may further control the display 40 to display the first status information or the second status information of the respective positions, as shown in FIG. 8.

In this embodiment, current detection data of a shelf in a current detection period may be acquired; then when it is determined that the current detection data satisfies a preset condition, first status information of respective positions may be determined from the current detection data, where the first status information indicates a first status that there is an object in a position or a second status that there is no object in a position; after that, when the current detection data indicates that a target position whose first status information indicates the first status exists, first status information of the target position may be acquired from previous detection data in a previous detection period; and finally, second status information of the target position may be determined based on the first status information of the target position in the current detection data and the previous detection data respectively, where the second status information indicates a third status that an object is put back. In this way, in this embodiment, it may be determined that the respective positions on the shelf have three statuses: the first status, the second status, and the third status. That is, in this embodiment, it may be determined that an object in a position on a shelf has just been put back, thereby accurately reflecting a status of a position, which is beneficial to improve an interaction experience.

Figure 9:
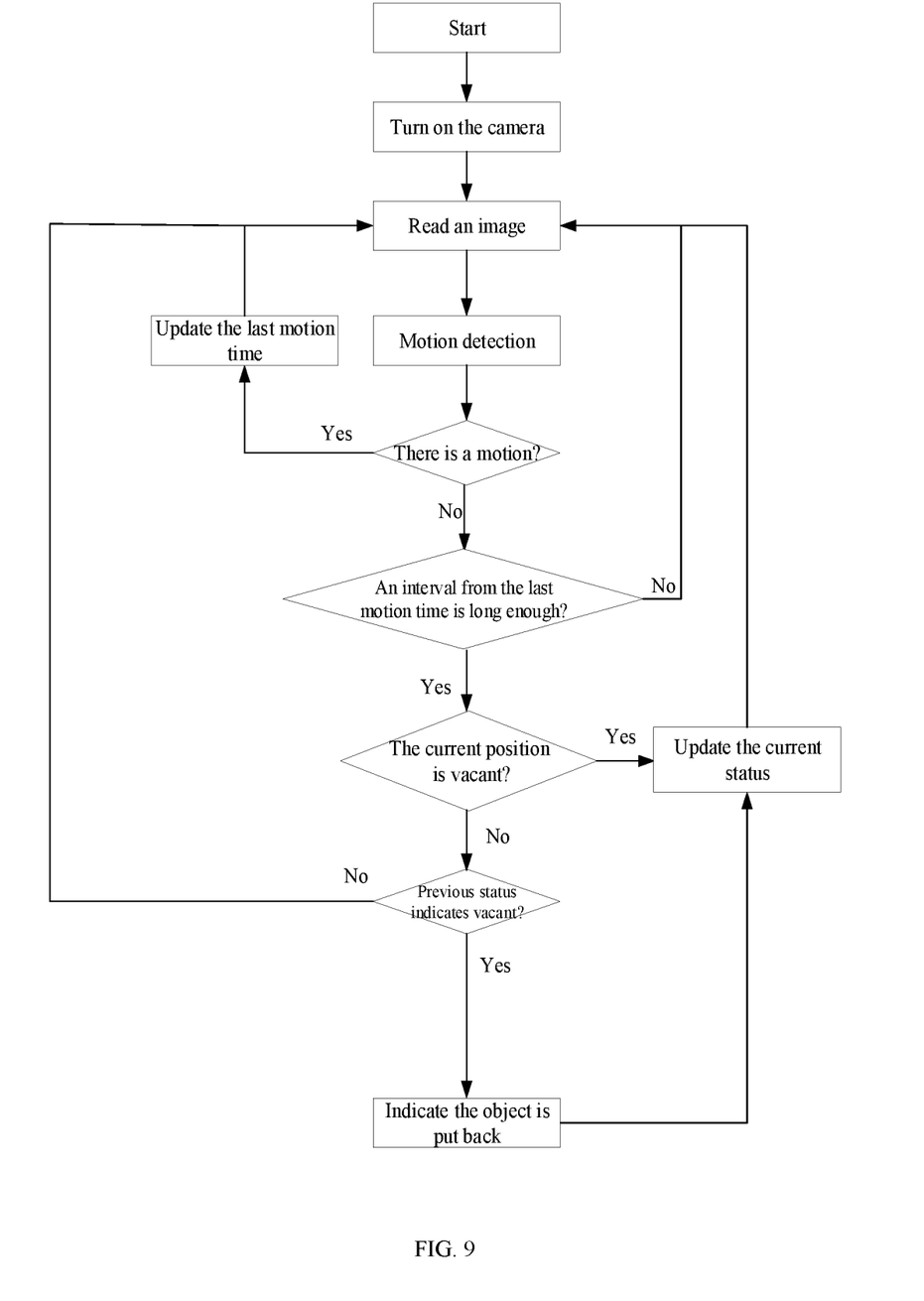
FIG. 9 is a diagram illustrating an application scenario according to an embodiment of the present disclosure.

A method of determining a status of a position on a shelf will be described below in conjunction with a scenario in which a camera is provided on the shelf. Referring to FIG. 9, the method may include a preparation phase and an operation phase.

I. Preparation phase

1. A camera is mounted in front of the shelf and captures an image inwards the shelf, and the processor may extract the image captured by the camera in real time.

2. The image is segmented into sub-images involving different object areas to be processed separately.

3. A standard template that is an image of an empty shelf is extracted, and background image data of each of the object areas is obtained therefrom.

4. A status discriminator is trained to determine whether each position is vacant or occupied.

II. Operation phase

1. The processor reads a frame of image from the camera as a current frame image.

2. The processor performs motion detection on the current frame image.

3. When determining that the current frame image includes motion data, the processor updates "the last motion time", ends the processing of the current frame image, and returns to step 1 in the operation phase.

4. When determining that the current frame image does not include the motion data, the processor determines a first time interval, that is, a time interval between the current detection time and "the last motion time".

5. If the first time interval is less than or equal to a first preset time interval (for example, 0.3 seconds), the processing of the current frame image is ended, and step 1 in the operation phase is returned.

6. If the first time interval is greater than the first preset time interval, the processor determines first status information of respective positions in the current frame image, which indicates there is an object placed in a position (a first status) or a position is vacant (a second status).

7. If it is determined in step 6 that the position is vacant, the processor may update the status information of the position to the second status, end the processing of the current frame image, and return to step 1in the operation phase.

8. If it is determined in step 6 that the position is not vacant, the processor may determine whether the position is vacant in previous status data.

9. If it is determined in step 8 that the position is vacant in the previous status data, it is determined that second status information indicates a third status (which indicates that an object is put back), the processing of the current frame image is ended, and step 1 in the operation phase is returned.

10. If it is determined in step 8 that the position is not vacant in the previous status data, the processing of the current frame image is ended, and step 1 in the operation phase is returned.

It should be noted that the above-mentioned first preset time interval may be set according to various scenarios. For example, for a scenario with a high timeliness requirement, the first preset time interval may be set to be relatively short, such as 10 seconds, otherwise, the first preset time interval may be set to be relatively long, such as 5 minutes or even an hour.

Figure 10:
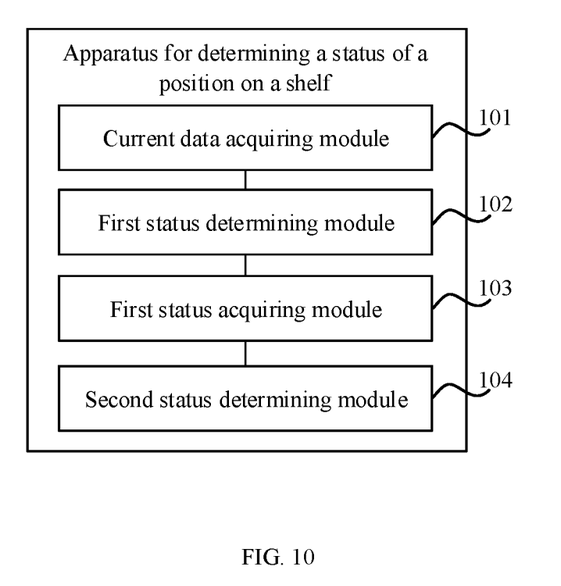
FIG. 10 is a block diagram illustrating an apparatus for determining a status of a position on a shelf according to an embodiment of the present disclosure.

On the basis of a method of determining a status of a position on a shelf described above, an embodiment of the present disclosure further provides an apparatus for determining a status of a position on a shelf. Referring to FIG. 10, the apparatus includes a current data acquiring module 101, a first status determining module 102, a first status acquiring module 103, and a second status determining module 104.

The current data acquiring module 101 is configured to acquire current detection data of the shelf in a current detection period, where the current detection data includes data of one or more positions on the shelf.

The first status determining module 102 is configured to determine first status information of respective positions from the current detection data, in response to determining that the current detection data satisfies a preset condition, where the first status information indicates a first status that there is an object in a position or a second status that there is no object in a position.

The first status acquiring module 103 is configured to: in response to the current detection data indicating that a target position whose first status information indicates the first status exists, acquire first status information of the target position from previous detection data in a previous detection period.

The second status determining module 104 is configured to determine second status information of the target position based on the first status information of the target position in the current detection data and the previous detection data respectively, where the second status information indicates a third status that an object is put back.

In an embodiment, the first status determining module 102 includes:

a motion data determining unit, configured to determine whether the current detection data includes motion data;

a first interval acquiring unit, configured to acquire a first time interval between time of the current detection period and time of a last detection period containing the motion data, in response to determining that the current detection data does not include the motion data; and a condition satisfaction determining unit, configured to determine that the current detection data satisfies the preset condition when the first time interval exceeds a first preset time interval.

In an embodiment, the current detection data includes a current frame image collected by a camera; and the motion data determining unit includes:

a grayscale difference acquiring subunit, configured to acquire a difference in grayscale values between the current frame image and a previous frame image at a same pixel;

a pixel number determining subunit, configured to determine a number of pixels with the difference in grayscale values exceeding a preset grayscale threshold; and a motion data determining subunit, configured to determine that the current frame image includes the motion data representing a motion relative to the previous frame image, in response to a ratio of the number to a total number of pixels in the current frame image exceeding a preset ratio threshold, otherwise determine that the current frame image does not include the motion data.

In an embodiment, the second status determining module 104 includes:

a third status determining unit, configured to determine that the second status information of the target position indicates the third status in response to the first status information of the target position in the previous detection data indicating the second status.

It should be noted that, an apparatus for determining a status of a position on a shelf according to this embodiment corresponds to a method of determining a status of a position on a shelf described above. For details of the apparatus, please refer to the contents of various method embodiments, which will not be repeated herein.

An embodiment of the present disclosure further provides a non-transitory computer-readable storage medium having a computer executable program stored therein, where the computer executable program, when executed by a processor, causes the processor to perform the above method of determining the status of the position on the shelf.

In the present disclosure, terms "first" and "second" are only used for descriptive purposes, and cannot be understood as indicating or implying relative importance. Term "a plurality of" refers to two or more, unless specifically defined otherwise. In the present disclosure, two components connected by a dashed line are in an electrical connection or contact relationship, and the dashed line is only used to make the drawings clearer and the solution of the present disclosure easier to understand.

Those skilled in the art will easily conceive of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the art that are not disclosed by the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A method of determining a status of a position on a shelf, the position being operatively configured to accommodate an object, the method comprising:

acquiring current detection data of the shelf in a current detection period, wherein the current detection data comprises data of one or more positions on the shelf;

determining whether the current detection data comprises motion data, wherein when a change in data of a position in the current detection data and previous detection data in a previous detection period exceeds a threshold, the data of the position in the current detection data is determined as the motion data;

in response to determining that the current detection data comprises the motion data, updating time of a last detection period containing the motion data, ending the current detection period, and returning to the step of acquiring the current detection data of the shelf in the current detection period;

acquiring a first time interval between time of the current detection period and time of the last detection period containing the motion data, in response to determining that the current detection data does not comprise the motion data;

ending the current detection period, and returning to the step of acquiring the current detection data of the shelf in the current detection period, when the first time interval is less than or equal to a first preset time interval;

determining first status information of respective positions from the current detection data when the first time interval exceeds the first preset time interval, wherein the first status information indicates a first status that there is an object in a position or a second status that there is no object in a position;

in response to the current detection data indicating that a target position whose first status information indicates the second status exists, updating a current status of the target position to the second status, ending the current detection period, and returning to the step of acquiring the current detection data of the shelf in the current detection period;

in response to the current detection data indicating that a target position whose first status information indicates the first status exists, acquiring first status information of the target position from previous detection data in a previous detection period; and in response to the first status information of the target position in the previous detection data indicating the second status, determining that second status information of the target position indicates a third status that an object has just been put back, ending the current detection period, and returning to the step of acquiring the current detection data of the shelf in the current detection period;

in response to the first status information of the target position in the previous detection data indicating the first status, determining that the object is always present in the target position, ending the current detection period, and returning to the step of acquiring the current detection data of the shelf in the current detection period; and controlling a display of the shelf to display the first status information or the second status information of the target position, wherein the current detection data comprises a current frame image collected by a camera; and determining whether the current detection data comprises the motion data, comprises:

acquiring a difference in grayscale values between the current frame image and a previous frame image at a same pixel;

determining a number of pixels with the difference in grayscale values exceeding a preset grayscale threshold; and determining that the current frame image comprises the motion data representing a motion relative to the previous frame image, in response to a ratio of the number to a total number of pixels in the current frame image exceeding a preset ratio threshold, otherwise determining that the current frame image does not comprise the motion data.

2. A shelf, comprising:

a main body provided with a plurality of layers, each of which is provided with a plurality of positions that are operatively configured to accommodate objects;

a data collector configured to collect current detection data of the shelf in a current detection period, wherein the current detection data comprises data of one or more positions on the shelf; and a processor coupled with the data collector and configured to:

acquire the current detection data of the shelf in the current detection period;

determine whether the current detection data comprises motion data, wherein when a change in data of a position in the current detection data and previous detection data in a previous detection period exceeds a threshold, the data of the position in the current detection data is determined as the motion data;

in response to determining that the current detection data comprises the motion data, update time of a last detection period containing the motion data, end the current detection period, and return to the step of acquiring the current detection data of the shelf in the current detection period;

acquire a first time interval between time of the current detection period and time of the last detection period containing the motion data, in response to determining that the current detection data does not comprise the motion data;

end the current detection period, and return to the step of acquiring the current detection data of the shelf in the current detection period, when the first time interval is less than or equal to a first preset time interval;

determine first status information of respective positions from the current detection data when the first time interval exceeds the first preset time interval, wherein the first status information indicates a first status that there is an object in a position or a second status that there is no object in a position;

in response to the current detection data indicating that a target position whose first status information indicates the second status exists, update a current status of the target position to the second status, end the current detection period, and return to the step of acquiring the current detection data of the shelf in the current detection period;

in response to the current detection data indicating that a target position whose first status information indicates the first status exists, acquire first status information of the target position from previous detection data in a previous detection period; and in response to the first status information of the target position in the previous detection data indicating the second status, determine that second status information of the target position indicates a third status that an object has just been put back, end the current detection period, and return to the step of acquiring the current detection data of the shelf in the current detection period;

in response to the first status information of the target position in the previous detection data indicating the first status, determine that the object is always present in the target position, end the current detection period, and return to the step of acquiring the current detection data of the shelf in the current detection period; and control a display of the shelf to display the first status information or the second status information of the target position, wherein the data collector comprises a camera, and the current detection data comprises a current frame image collected by the camera; and when determining whether the current detection data comprises the motion data, the processor is further configured to:

acquire a difference in grayscale values between the current frame image and a previous frame image at a same pixel;

determine a number of pixels with the difference in grayscale values exceeding a preset grayscale threshold; and determine that the current frame image comprises the motion data representing a motion relative to the previous frame image, in response to a ratio of the number to a total number of pixels in the current frame image exceeding a preset ratio threshold, otherwise determining that the current frame image does not comprise the motion data.

3. The shelf according to claim 2, wherein the data collector further comprises a plurality of pressure sensors provided at the bottom of the respective positions, and the current detection data further comprises current pressure data collected by the plurality of pressure sensors.

4. The shelf according to claim 2, wherein the display is provided at a preset location of the main body.

5. A non-transitory computer-readable storage medium having a computer executable program stored therein, wherein the computer executable program, when executed by a processor, causes the processor to perform the method according to claim 1.

* * * * *